United States Patent [19]

Tackett

[11] 4,426,830
[45] Jan. 24, 1984

[54] LAWN CLIPPING VACUUM COLLECTOR

[76] Inventor: DeForrest Tackett, Rte. 1, Box 192A, Reddick, Fla. 32686

[21] Appl. No.: 423,521

[22] Filed: Sep. 27, 1982

[51] Int. Cl.³ .................................. A01D 35/262
[52] U.S. Cl. ............................ 56/202; 56/320.2; 56/16.6
[58] Field of Search ............... 56/320.2, 202, 13.3, 56/16.6

[56] References Cited

U.S. PATENT DOCUMENTS

| | | | |
|---|---|---|---|
| 2,807,925 | 10/1957 | Andrews | 56/13.3 |
| 2,920,435 | 1/1960 | Vallone | 56/13.3 |
| 3,006,128 | 10/1961 | Weiland | 56/320.2 |
| 4,193,249 | 3/1980 | Tachett | 56/320.2 |
| 4,310,998 | 1/1982 | Cuba | 56/320.2 |
| 4,345,416 | 8/1982 | Cameron | 56/202 |

*Primary Examiner*—Jay N. Eskovitz
*Attorney, Agent, or Firm*—Harold Gell

[57] ABSTRACT

A vacuum apparatus which may be supported by a tractor-lawn mower combination and which includes a collection bin and a vacuum producing impeller driven by a hydraulic motor for collecting grass clippings, leaves and similar refuse is presented herein. The impeller and hydraulic motor are located within the collection bin and provided with ducts to channel exhaust air through the bottom of the bin to muffle operational noise and increase the efficiency of the system.

10 Claims, 4 Drawing Figures

LAWN CLIPPING VACUUM COLLECTOR

THE INVENTION

This invention relates to a hydraulic powered vacuum refuse collector adapted for attachment to a tractor type vehicle and incorporating a hydraulically driven impeller. More specifically, the invention relates to a lawn clipping vacuum collector which may be affixed directly to a tractor type lawn mower wherein the vacuum generating impeller is positioned within the refuse collecting bin and ductwork is provided within the bin to cause refuse to be deposited and exhaust air deflected out of the bottom of the bin.

BACKGROUND OF THE INVENTION

A relatively large variety of yard and garden tractors are utilized by home owners to carry and power a wide variety of attachments such as rotary lawn mowers, spreaders, sprayers, rollers, aerators, plows, cultivators, harrows, rotary spaders, seed planters, and snow blowers. Many of these devices incorporate rotary tools which require a driving force that is usually provided by a primary power take-off from the tractor engine. A primary example of such devices is the rotary lawn cutting attachment commonly used to convert yard and garden tractors into riding lawn mowers.

Riding lawn mowers which are specifically designed as such or which are converted yard and garden tractors produce a large volume of grass clippings which must be removed from lawns to prevent a heavy thatch of clippings from building up which will smother new grass growth, provide a hiding place for destructive insects and provide an environment suitable for the rapid growth of mold, fungus and other lawn diseases. The removal of grass clippings has been accomplished by a variety of techniques ranging from a manual rake to an elaborate vacuum cleaning system. The manual rake functions satisfactorily for a relatively small area but when large grass tracks are groomed, that method is not practical. For large tracks, tractor powered mowers normally utilize a relatively sophisticated vacuum or vacuum and sweeper devices.

An example of a prior art means for removing grass clippings produced by a tractor type lawn mower is presented in U.S. Pat. No. 3,903,565 on "Leaf And Grass Cart Bagger" issued to Littleberry T. Hicks on Sept. 9, 1975. This patent discloses a refuse container mounted in a small trailer adapted to be pulled by the grass mowing tractor. Clippings are transported from the cutting area to the refuse container via a duct vacuum transport which utilizes a blower powered by some unknown means. Presumably the blower is driven by an auxiliary internal combustion engine in a manner similar to that illustrated on Page 10 of the 1976 Yard and Garden Tractors and Attachments Catalog prepared by Sears, Roebuck & Company.

The use of an auxiliary internal combustion engine to drive a blower is undesirable for it tends to increase the complexity and cost of the grass clipping collection system. Furthermore it is an inefficient waste of petroleum products which is to be avoided in view of the constant threat of fossil fuel supply exhaustion.

Trailer systems such as the Hicks system discussed above are not satisfactory when mowing around flower beds and similar areas for as the tractor rounds the corner, the trailer will turn in an arc which will cause the wheels to destroy the corner portions of the flower bed or other structure which is being circumnavigated. In some instances, such as going around the corners of buildings, the tractor has to swing wide to prevent the trailing grass catcher from striking the corners of the building and thus the grass close to the building cannot be mowed.

S. E. Clarke in U.S. Pat. No. 3,203,022 on "Vacuum Cleaner For Lawns" issued Aug. 31, 1965 suggests a way to eliminate the need for an auxiliary internal combustion engine for powering the blower in a vacuum lawn sweeper. Unfortunately this system can be used only with vehicles having a rear wheel differential gear train that incorporates a power take-off shaft. This adds significantly to the cost of the vehicle and renders the vacuum cleaner attachment a very special purpose device fabricated for a specific type of tractor and not one which is normally found in the yard and garden market. Note that the Clarke device also incorporates a separate vacuum nozzle that adds significantly to the complexity and cost of producing the device and that it further requires a wheeled dolly to support the refuse container. The shortcomings of the wheeled dolly are similar to those discussed for the wheeled cart above.

James F. Peterson, U.S. Pat. No. 4,047,368 on "Attachment For Collecting Mower Discharge In A Plurality Of Bags" issued Sept. 13, 1977 is an example of a vacuum lawn sweeper similar to the Clarke device in that power is derived from a take-off associated with the rear wheel drive differential of the tractor. Here, as in Clarke, special adaptations to the tractor drive train must be provided to enable power to be transferred from the vehicle to the blower impeller. Also, devices such as this only provide power to the blower while the vehicle is in motion.

The various problems suggested are partially solved by U.S. Pat. No. 4,104,852 and U.S. Pat. No. 4,193,249 issued to DeForrest Tackett on "Lawn Clipping Vacuum Collector" and "Hydraulic Drive For Lawn Clipping Vaccum Collector" respectively. The first U.S. Pat. No. 4,104,852 discloses a vacuum collector which is supported at the back of a riding lawn mower and driven by a belt drive system which couples energy from the rotary lawn mower drive shaft to the vacuum blower impeller and the second patent, U.S. Pat. No. 4,193,249 discloses a similar vacuum collector wherein the belt drive system is replaced by a hydraulic drive.

All of the known prior art devices exemplified in the foregoing examples are relatively cumbersome machines which create a high level of noise pollution that renders them possibly dangerous to the operator and definitely offensive to the neighbors.

OBJECTIVES OF THE INVENTION

In view of the obvious inability of the prior art systems to meet a growing need for a relatively simple, inexpensive, and quiet refuse collector for a tractor type lawn mower, it is a primary objective of the present invention to provide a vacuum refuse collector utilizing a hydraulically powered vacuum blower impeller positioned within a refuse collection bin to reduce the noise escaping from the system.

A further objective of the present invention is to provide a vacuum refuse collector wherein the vacuum blower assembly is positioned within a refuse collection bin such that collected refuse surrounds the blower assembly and muffles operational sounds thereof.

It is a primary objective of the present invention to provide an exhaust air deflection ducting system within the refuse collection bin of a vacuum refuse collector which will cause refuse to be deposited in the bottom of the bin and allow exhaust air to exit from the bottom of the bin without being restricted or impeded by the collected refuse.

A further objective of the present invention is to provide a relatively simple, inexpensive and economically operable grass clipping collector system for use with a tractor type lawn mower.

It is a further objective of the present invention to provide a hydraulically driven grass clipping collection system for a tractor type lawn mower which is adapted to be driven by a hydraulic power train deriving its energy from the tractor engine.

A still further objective of the present invention is to provide a grass clipping collector incorporating a vacuum directed refuse conveying system adapted to transport clippings from a mower housing to a refuse container.

Another objective of the present invention is to provide a grass clipping vacuum cleaner which will run in response to an individual control means so long as the vehicle engine is operating, regardless of whether the lawn mower blades are in operation or the tractor is moving.

It is a further objective of the present invention to provide a grass clipping collector which may easily be attached to and removed from a tractor.

Another objective of the present invention is to provide a grass clipping collector attachment for a tractor type lawn mower which does not require an auxiliary power source or support wheels other than provided by the tractor.

A still further objective of the present invention is to provide a grass clipping collector for a tractor type lawn mower which may be economically produced and has a minimum number of working parts to increase product reliability.

Another objective of the present invention is to provide a hydraulic power drive for coupling rotary energy from a tractor engine to a grass clipping collector.

The foregoing and other objectives of the invention will become apparent in light of the drawings, specification and claims contained herein.

SUMMARY OF THE INVENTION

Presented hereby is a hydraulically driven grass clipping vacuum collector comprised of a hydraulic pump adapted to be attached to and driven by a tractor engine, a hydraulic motor driving a vacuum producing impeller, a control means for hydraulic fluid flow between the hydraulic pump and motor, and a refuse collection bin adapted to house the vacuum producing assembly and which incorporates exhaust air duct work designed to cause refuse to be deposited in the botton of the bin and air to be exhausted through the underside of the bin. The refuse collection bin also includes an access door which provides a means to empty the bin.

The refuse collection bin may be supported by the associated tractor or it may be towed by the tractor and supported by skids or wheels.

A vacuum conveyor duct is coupled from the lawn mower discharge chute to the vacuum producing impeller within the collection bin.

DESCRIPTION OF THE INVENTION

Figure 1:
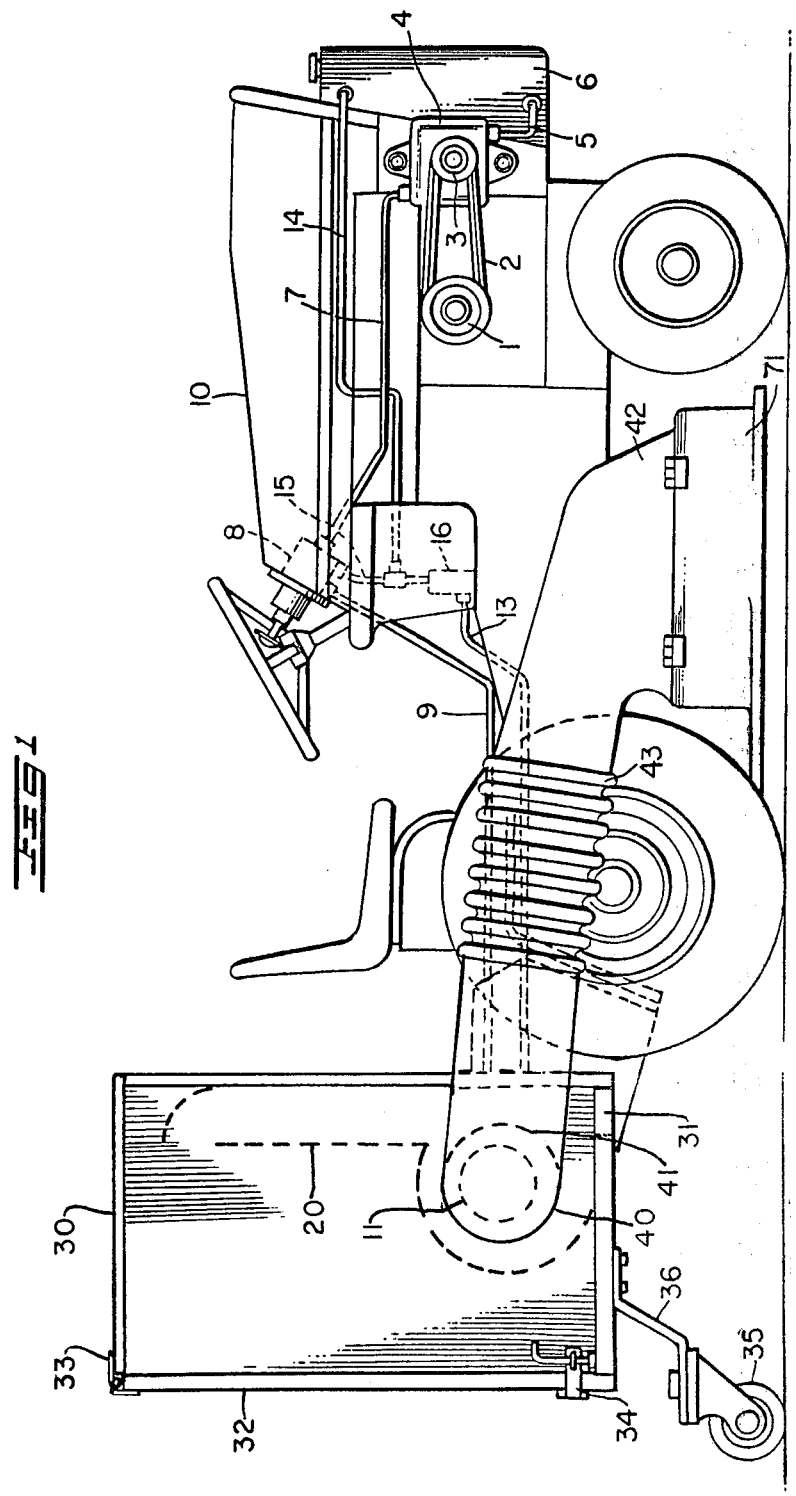
FIG. 1 is a side view of a tractor type lawn mower incorporating the grass clipping vacuum collector.

Referring to the drawings, FIG. 1 presents a side view of the lawn or grass clipping collector affixed to a tractor 10. The assembly consists of the refuse collection bin 30, a blower duct housing 20 and the conveyor duct assembly. The conveyor duct assembly includes a rigid duct 41 between the inlet opening in the blower duct housing 20 and an elbow adapter 40, an adapter 42 connected to the lawn mower blade housing 71 and a flexible duct 43 coupling the adapter 42 to the elbow adapter 40.

The refuse collection bin 30 incorporates a discharge opening 31 in the bottom panel. This opening provides a means for exhaust air to leave the refuse collection bin without a buildup of undue pressure which would hamper the operation of the system. The refuse collection bin also includes an access door 32 which is located at the back of the bin and supported by hinges 33 which permit the door to be opened for easy access to the interior of the bin. A latch 34 is provided to prevent accidental opening of the refuse collection bin during use. A wheel or caster 35 is coupled to the bottom of bin 30 by a spring arm 36. The wheel 35 and spring arm 36 provide support for the refuse collection bin 30 when the effective center of gravity of the tractor shifts due to vehicle acceleration and/or an excessively heavy load of grass clippings in the collection bin. An alternate embodiment is considered wherein the wheel is replaced by a skid to simplify the mechanism.

If the tractor being used includes a hydraulic system for driving accessories, the motor 11 is coupled to the discharge and return lines provided. If the tractor does not have a hydraulic system, an engine auxiliary drive pulley 1 commonly found on many garden tractors is coupled by a drive belt 2 to pulley 3 which is secured to the shaft of hydraulic pump 4. The hydraulic pump is secured to the engine or engine mounting means in a preferred embodiment to eliminate excessive strain on the drive belt 2 which could be caused by vibration between the engine and tractor chassis.

The hydraulic pump 4 may be any one of a variety of commercially available hydraulic pumps such as the Model D-21 produced by Delta Power Hydraulic Company. The output of the pump 4 is coupled via hydraulic line 7 to control valve 8 which in a preferred embodiment is a hydraulic control valve of the type which has a single input and two outputs having a variable output ratio therebetween such as a Gressen Model S-50.

The control valve 8 is secured to the tractor instrument panel where it may be easily manipulated by the tractor operator. One output of the valve is coupled via hydraulic line 9 to a hydraulic motor 11 which may be any one of the numerous commercially available motors such as the Model D-23M produced by Delta Power Hydraulic Company. The hydraulic fluid, after driving the motor 11, is returned to the system via hydraulic lines 13 and 14 which transfer the expended hydraulic fluid to the hydraulic fluid reservoir 6. The hydraulic fluid reservoir 6 in a preferred embodiment is a five gallon tank which helps counter balance the weight of the refuse storage bin 30 and supplies hydraulic fluid via hydraulic line 5 to the hydraulic pump 4.

When the hydraulic control valve 8 is placed in any position other than the position which allows 100% of the hydraulic fluid to flow through hydraulic line 9, the surplus hydraulic fluid is transferred through hydraulic line 15 and hydraulic line 14 to the hydraulic storage tank 6. A one-way valve 16 is incorporated in hydraulic line 13 to prevent the surplus hydraulic flow in line 15 from creating back pressure in the hydraulic motor which could stall the motor or cause it to attempt to operate in a reverse direction.

Figure 2:
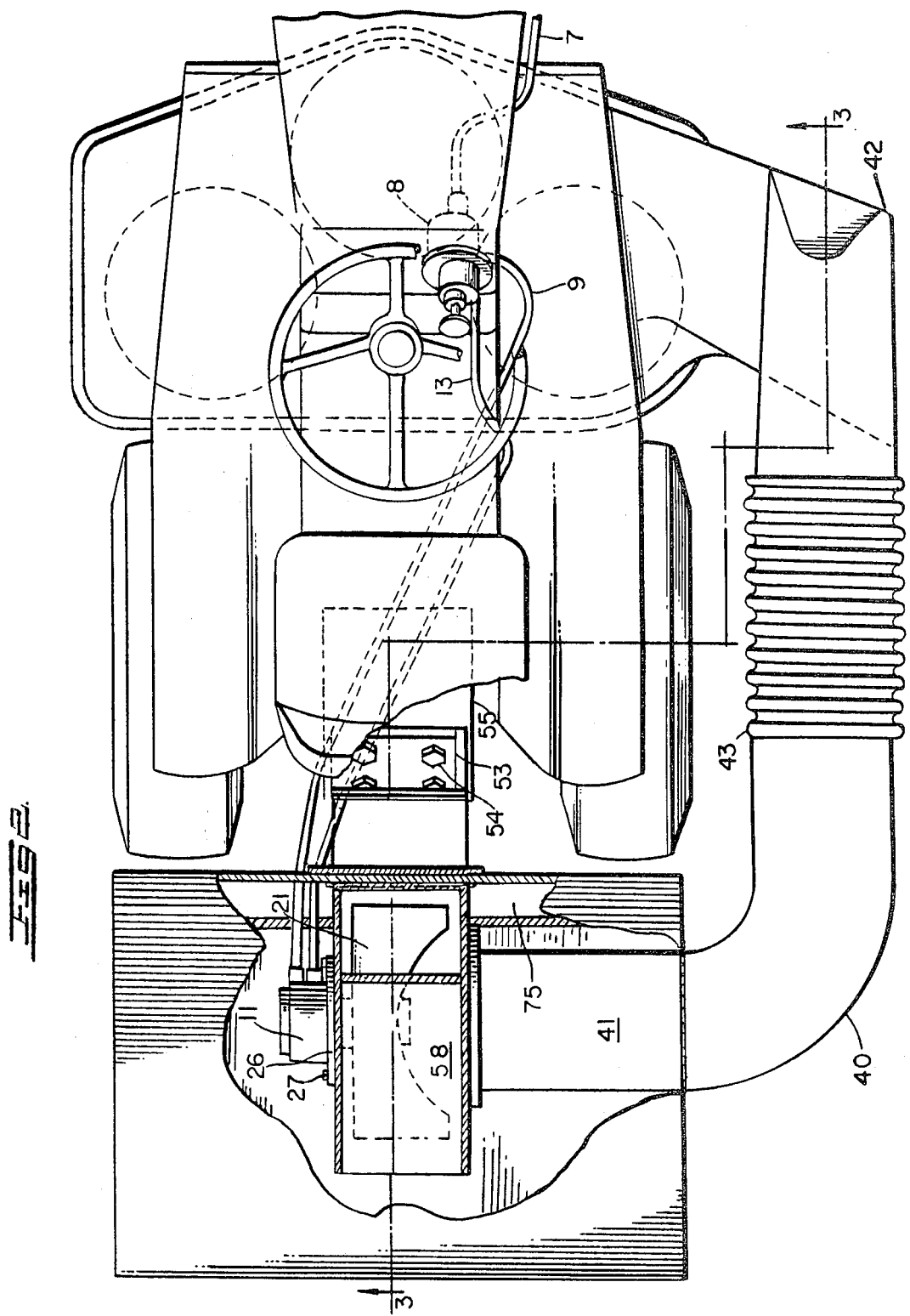
FIG. 2 is a top view of the tractor and grass clipping collector and hydraulic motor with portions broken away and shown in sections.

FIG. 2 is a top view of the grass clipping collector attached to a tractor. This view is partially cut away to illustrate the location of the blower impeller blades 21 and hydraulic motor 11.

Figure 3:
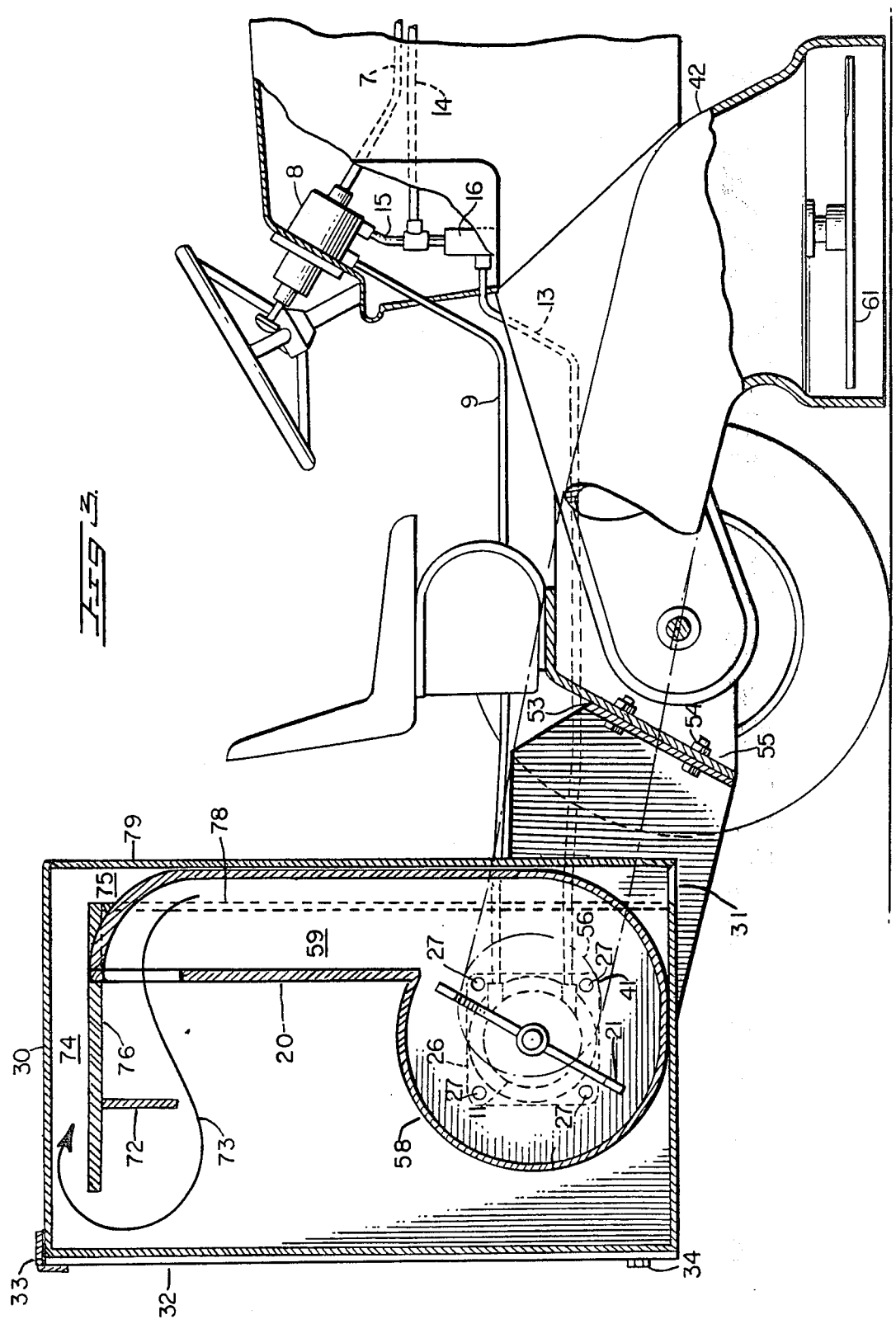
FIG. 3 is a cutaway view along the line 3—3 of FIG. 2 illustrating the vacuum impeller and its association with the conveyor duct, refuse container, and exhaust duct work.

FIG. 2 and FIG. 3 illustrate the coupling flange 53 which includes four nuts and bolts 54 adapted to secure the refuse collection bin 30 to flange 55 on the back of the tractor. In alternate embodiments, the flange 53 may be secured to an adapter which mates with the accessory mounting pad or hitch of the tractor.

The cutaway view in FIG. 3 illustrates the opening 56 in the blower duct housing 20 to which rigid duct 41 is connected. The hydraulic motor 11 is supported by a mounting flange 26 which is fastened to the side of the duct housing 20 opposite the blower duct opening 56 by a plurality of fasteners 27.

When the system is in operation, clippings produced by lawn mower blades 61 of FIG. 3 are thrown and blown into adapter 42 and drawn through the conveyor duct assembly into the blower duct housing 20 by the blower impeller blades 21. The blower duct housing 20 includes a curved wall which forms an impeller cavity 58 terminating in exhaust duct 59 which channels grass clippings or refuse into the storage section of refuse collection bin 30.

The upper end of exhaust duct 59 is curved to form a discharge opening which directs the collected refuse toward the back of the refuse collection bin 30. A deflector plate 72 is positioned in front of the discharge opening to absorb the energy of particles exiting the discharge chute 59 so that they will drop to the bottom of the refuse collection bin while the air that was carrying the refuse flows via a circuitous path 73 into the upper exhaust plenum 74, through the vertical exhaust plenum 75 and out the discharge opening 31.

Figure 4:
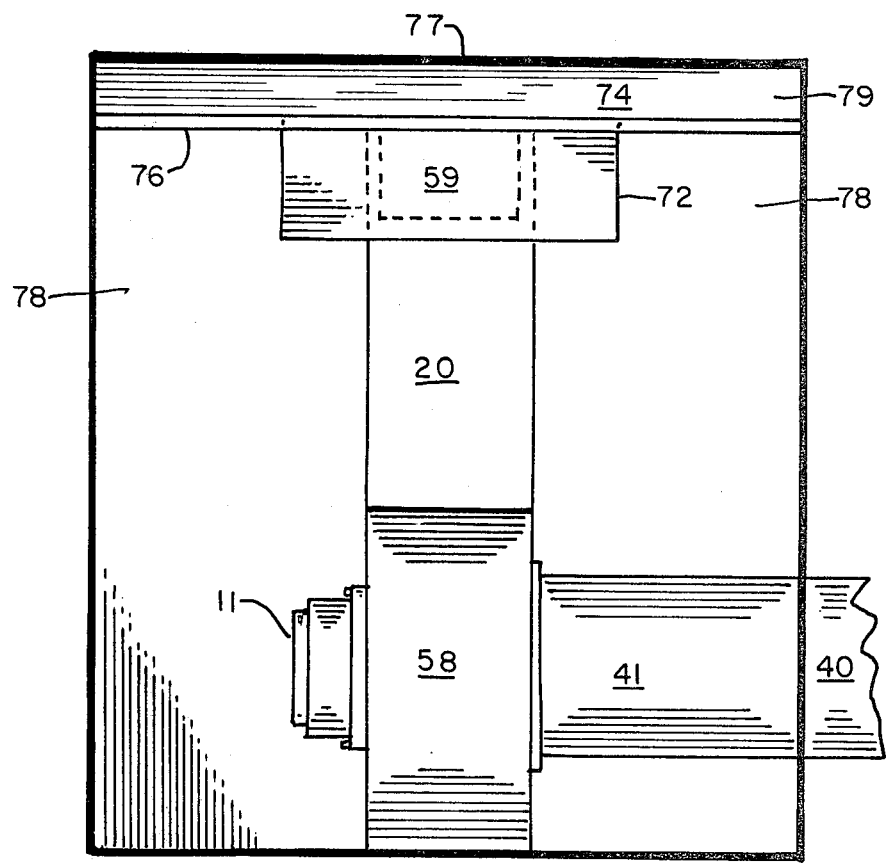
FIG. 4 is a rear view of the refuse collection bin with the door removed.

FIG. 4 is an illustration of the rear of the lawn clipping vacuum collector with the access door removed to reveal the positioning of the blower duct housing and associated duct work. The blower duct housing 20 is positioned within the refuse collection bin in the bottom, forward center so that refuse striking the deflector baffle 72 will be deposited about the exterior walls forming the impeller cavity 58, hydraulic motor 11, and rigid duct 41 to muffle the sounds created by the impeller.

A shelf 76 traverses the width of the refuse collection bin 30 and serves as a mounting for deflection baffle 72 and cooperates with the top 77 of the collection bin to form the upper exhaust plenum 74. The shelf 76 is set back from the rear of the refuse collection bin to provide an opening when the access door is closed whereby air may be forced up and into plenum 74. The other end of shelf 76 joins a vertical duct forming wall 78 which is spaced apart from the forward wall 79 of the refuse collection bin to form the vertical exhaust plenum 75 of FIG. 3.

The discharge opening of exhaust duct 59 and the cross sectional areas of the upper exhaust plenum 74 and vertical exhaust plenum 75 and the interior of the refuse collection bin are dimensioned relative to each other so that the velocity of the air exiting the exhaust duct 59 decrease to a point where it cannot transport the grass clippings and other refuse carried through the system from the adapter 42 so that the material drops to the bottom of the refuse collection bin.

In operation, the impeller 21 cooperates with the lawn mower blades 61 in that the lawn mower blades create a flow of air carrying grass clippings and refuse into the conveyor duct assembly via adapter 42 and the impeller blades 21 create a partial vacuum to draw the air carrying the clippings and refuse through the remaining sections of the duct assembly and through the blower duct housing. The air and refuse carried thereby exits exhaust duct 59 and are dispersed within the refuse collection bin where the air looses its velocity and thus its ability to carry the particulate refuse material. Separation also occurs because upon exiting the exhaust duct 59, the particulate refuse material strikes deflector baffle 72 and thereby looses the kinetic energy gained from the action of the lawn mower blades 61 and impeller blades 21 so that it will fall to the bottom of the refuse collection bin while the relatively particulate free air flows out the exhaust plenum system.

The vertical exhaust plenum 75 may be formed from a continuous sheet of material 78 joining both sides of the refuse collection bin 30 or it may be a bifurcated sheet joining the sides of the blower duct housing 20 to the sides of the refuse collection bin. In either case, a vertical plenum is formed via cooperation with the front wall 79 of the refuse collection bin 30.

Although preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim as a new and useful contribution to the art and for which I desire Letters Patent is:

1. A vacuum collector adapted to be used in conjunction with a lawn mower, comprising:
a refuse collection bin for collecting grass clippings;
a blower duct housing totally enclosed within said refuse collection bin;
an impeller within said blower duct housing, said impeller positioned in the lower section of said blower duct housing so that accumulated grass clippings will at least partially surround said portion of said blower duct housing including said impeller; and
a hydraulic motor for driving said impeller.

2. A vacuum collector as defined in claim 1, wherein said blower duct housing includes an exhaust duct having an exhaust opening within said refuse collection bin and dimensioned with respect to the interior volume of said refuse collection bin so that the velocity of air exiting said exhaust duct will decrease to a value below that required to transport refuse that was carried through said blower duct housing.

3. A vacuum collector as defined in claim 2, further comprising a deflector baffle positioned in front of said exhaust opening.

4. A vacuum collector as defined in claim 2, wherein said refuse collection bin includes a top panel, a bottom panel, a forward panel joining said top and bottom panels and side panels joining said top and bottom panels and said forward panel, further comprising:
a plenum forming wall spaced apart from said forward panel and joined to said side panels and said bottom panel;
an opening in said bottom panel positioned between said plenum forming wall and said forward panel; and
a shelf spaced apart from said top panel and joining said side panels and said plenum forming wall for forming an upper plenum chamber in communication with said opening in said bottom panel via the plenum created by said plenum forming wall.

5. A vacuum collector as defined in claim 4, further comprising:
a deflector baffle connected to said shelf and positioned in front of said exhaust opening.

6. A vacuum collector as defined in claim 4, comprising:
a barrier means forming a wall joining said top panel, bottom panel and side panels.

7. A vacuum collector as defined in claim 2, comprising:
an access door in said refuse collection bin.

8. A vacuum collector as defined in claim 2 coupled to and powered by a lawn mowing device of the type including a discharge chute, comprising
an inlet in said blower duct housing; and
a conveyor duct means for transporting air and particulate matter between said discharge chute and said inlet.

9. A vacuum collector as defined in claim 2, further comprising:
an air discharge opening in the bottom of said refuse collection bin; and
an exhaust plenum means for coupling air from said upper regions of said refuse collection bin to said air discharge opening.

10. A vacuum collector as defined in claim 4 coupled to and powered by a lawn mowing device of the type including a discharge chute, comprising:
an inlet in said blower duct housing; and
a conveyor duct means for transporting air and particulate matter between said discharge chute and said inlet.

* * * * *